US010437423B2

(12) United States Patent
Nguyen

(10) Patent No.: US 10,437,423 B2
(45) Date of Patent: Oct. 8, 2019

(54) METHODS AND APPARATUSES FOR PROVIDING AN INFINITELY SCROLLING ACCUMULATOR

(71) Applicant: Hyland Software, Inc., Westlake, OH (US)

(72) Inventor: Hai D. Nguyen, Dacula, GA (US)

(73) Assignee: HYLAND SOFTWARE, INC., Westlake, OH (US)

( * ) Notice: Subject to any disclaimer, the term of this patent is extended or adjusted under 35 U.S.C. 154(b) by 365 days.

(21) Appl. No.: 14/928,228

(22) Filed: Oct. 30, 2015

(65) Prior Publication Data

US 2017/0123601 A1 May 4, 2017

(51) Int. Cl.
| | | |
|---|---|---|
| *G06F 3/048* | (2013.01) | |
| *G06F 3/0482* | (2013.01) | |
| *G06F 3/0485* | (2013.01) | |
| *G06F 16/9535* | (2019.01) | |
| *G06F 16/242* | (2019.01) | |
| *G06F 16/26* | (2019.01) | |

(52) U.S. Cl.
CPC .......... *G06F 3/0482* (2013.01); *G06F 3/0485* (2013.01); *G06F 16/2425* (2019.01); *G06F 16/26* (2019.01); *G06F 16/9535* (2019.01)

(58) Field of Classification Search
CPC .. G06F 3/04842; G06F 3/0482; G06F 3/0481; G06F 3/0484; G06F 17/211; G06F 3/04817; G06F 17/246; G06F 17/2247; G06F 17/3089; G06F 3/04847
USPC .................................................. 715/724, 770
See application file for complete search history.

(56) References Cited

U.S. PATENT DOCUMENTS

| | | | |
|---|---|---|---|
| 7,647,338 B2 | 1/2010 | Lazier et al. | |
| 8,005,857 B2 | 8/2011 | Farago et al. | |
| 9,235,328 B1* | 1/2016 | Myers | G06F 3/04817 |
| 9,417,757 B1* | 8/2016 | Caiani | G06F 3/048 |
| 2007/0208771 A1* | 9/2007 | Platt | G06F 17/30038 |
| 2010/0180186 A1 | 7/2010 | Skinner et al. | |
| 2012/0066178 A1* | 3/2012 | Omansky | G06F 17/5004 |
| | | | 707/626 |
| 2013/0091471 A1 | 4/2013 | Gutt et al. | |
| 2013/0263044 A1 | 10/2013 | MacLaurin et al. | |
| 2014/0208259 A1 | 7/2014 | Desai | |
| 2015/0007108 A1* | 1/2015 | Ozcelik | G06F 3/0482 |
| | | | 715/810 |

* cited by examiner

*Primary Examiner* — Di Xiao
(74) *Attorney, Agent, or Firm* — Medley, Behrens & Lewis, LLC

(57) ABSTRACT

A method, apparatus and computer program product are provided for implementing an infinitely scrolling accumulator. An example of the method includes providing, by a computer processor, a user interface comprising an available window and a selected window, the available window associated with an available window query and the selected window associated with a selected window query, displaying at least one record in the available window via the user interface, receiving, via the user interface, a selection of the at least one record displayed in the available window, modifying the available window query such that the available window query does not select the at least one record from a database, and modifying the selected window query such that the selected window query selects the at least one record from the database.

20 Claims, 9 Drawing Sheets

METHODS AND APPARATUSES FOR PROVIDING AN INFINITELY SCROLLING ACCUMULATOR

TECHNOLOGICAL FIELD

Example embodiments of the present invention relate generally to methods and devices enabling interface controls for computing devices and, more particularly, to methods and apparatuses for providing an infinitely scrolling accumulator interface control.

BACKGROUND

An "accumulator" interface control (also known as a "dual list" or "list builder") is a user interface component that allows movement of items from a first list to a second list, such that items moved to the second list are selected or deselected. Such interface controls are typically used in environments where there is a need to include or exclude particular items from a data set. However, when such interface controls are used to access large data sets, a significant performance impact is observed due to the need to load the entire data set into memory for display within the interface control. For example, attempting to provide a list of thousands of database records within a single selection window of the interface control may cause the interface control to become inoperable for a lengthy period of time while the thousands of records are requested from the database, transmitted to the interface control, and loaded in memory to build the list of items displayed in the selection window.

The problem of requesting and displaying large numbers of records without impacting performance has been dealt with in some contexts through the use of an "infinite scroll" design pattern. Interfaces designed according to this pattern frequently implement functionality that retrieves sets of records in a piecemeal manner, such that only a small subset of a large number of records is requested for loading into an interface at any given time. However, while such functionality may be straightforward to implement in, for example, a web page with a process that posts a "scroll" event in response to the user reaching the end of a list of items within the interface, such techniques are inadequate in the context of an accumulator, which maintains simultaneous lists of both selected items and items available for selection. Attempting to implement such a design pattern in an accumulator often results in a lengthy, unwieldy query being developed for one or both lists of items as individual items are selected and corresponding query language constructed. Implementation of an infinitely scrolling list in an accumulator also requires fetching of a dataset beforehand, causing the data displayed within the accumulator to not necessarily reflect the freshest data from the database. The piecemeal access and display of results also limits the ability to include/exclude all items from the list since not all items are necessarily loaded for selection at any given time.

Through applied effort, ingenuity, and innovation, Applicant has solved many of these identified problems by developing a technical solution that is embodied by the present invention, which is described in detail below.

BRIEF SUMMARY

Methods, apparatuses and computer program products are therefore provided according to example embodiments of the present invention in order to provide an infinitely scrolling accumulator. Embodiments include a method for implementing an infinitely scrolling accumulator. The method includes providing, by a computer processor, a user interface comprising an available window and a selected window. The available window is associated with an available window query and the selected window is associated with a selected window query. The method also includes displaying at least one record in the available window via the user interface, receiving, via the user interface, a selection of the at least one record displayed in the available window, receiving an input indicating an intent to move the selected at least one record from the available window to the selected window, in response to receiving the input, modifying the available window query such that the available window query does not select the at least one record from a database, and in response to receiving the input, modifying the selected window query such that the selected window query selects the at least one record from the database.

The method may include executing the available window query and the selected window query subsequent to modifying the available window query and the selected window query. The results of the execution of the available window query and the selected window query are utilized to update the available window and the selected window, respectively. The method may include filtering the available window based on a filtering criterion, receiving, via the user interface, a selection of an interface control to include all records corresponding to the filtering criterion, determining a modification to the selected window query based on the filtering criterion, and modifying the selected window query to select records matching the filtering criterion. The method may include modifying the available window query to exclude records matching the filtering criterion. The method may include modifying a data structure comprising a set of filters for the available window in response to receiving the selection of the at least one record. The modification to the available window query may be determined based on the data structure. The available window and the selected window may be implemented using an infinite scroll design pattern. The method may include causing execution of the available window query to obtain a set of available window query results, determining a reduced subset of the available window query results, wherein the subset of available window query results contains fewer records than the set of available window query results, and loading the reduced subset of available window query results into the available window of the user interface. The reduced subset of available window query results may be determined based at least in part on at least one of a position identifier associated with at least one record displayed within the available window or a page number associated with the at least one record displayed within the available window.

Embodiments also provide an apparatus for implementing an infinitely scrolling accumulator. The apparatus includes a processor and a memory. The processor is configured by instructions stored in the memory to configure the apparatus to at least provide a user interface comprising an available window and a selected window. The available window is associated with an available window query and the selected window associated with a selected window query. The processor is also configured to display at least one record in the available window via the user interface, receive, via the user interface, a selection of the at least one record displayed in the available window, receive an input indicating an intent to move the selected at least one record from the available window to the selected window, in response to receiving the input, modify the available window query such that the available window query does not select the at least one record from a database, and in response to receiving the input, modify the selected window query such that the selected window query selects the at least one record from the database.

The apparatus may be further configured to execute the available window query and the selected window query subsequent to modifying the available window query and the selected window query. The results of the execution of the available window query and the selected window query may be utilized to update the available window and the selected window, respectively. The apparatus may be further configured to filter the available window based on a filtering criterion, receive, via the user interface, a selection of an interface control to include all records corresponding to the filtering criterion, determine a modification to the selected window query based on the filtering criterion, and modify the selected window query to select records matching the filtering criterion. The apparatus may be further configured to modify the available window query to exclude records matching the filtering criterion. The apparatus may be further configured to modify a data structure comprising a set of filters for the available window in response to receiving the selection of the at least one record. The modification to the available window query may be determined based on the data structure. The available window and the selected window may be implemented using an infinite scroll design pattern. The apparatus may be further configured to cause execution of the available window query to obtain a set of available window query results, determine a reduced subset of the available window query results, wherein the subset of available window query results contains fewer records than the set of available window query results, and load the reduced subset of available window query results into the available window of the user interface. The reduced subset of available window query results may be determined based at least in part on at least one of a position identifier associated with at least one record displayed within the available window or a page number associated with the at least one record displayed within the available window.

Embodiments also provide a non-transitory computer readable storage medium comprising instructions that, when executed by a processor, cause the processor to implement an infinitely scrolling accumulator. The instructions are configured to at least provide a user interface comprising an available window and a selected window. The available window is associated with an available window query and the selected window associated with a selected window query. The instructions are also configured to display at least one record in the available window via the user interface, receive, via the user interface, a selection of the at least one record displayed in the available window, receive an input indicating an intent to move the selected at least one record from the available window to the selected window, in response to receiving the input, modify the available window query such that the available window query does not select the at least one record from a database, and in response to receiving the input, modify the selected window query such that the selected window query selects the at least one record from the database. The instructions may be further configured to execute the available window query and the selected window query subsequent to modifying the available window query and the selected window query, wherein the results of the execution of the available window query and the selected window query are utilized to update the available window and the selected window, respectively. The instructions may be further configured to filter the available window based on a filtering criterion, receive, via the user interface, a selection of an interface control to include all records corresponding to the filtering criterion, determine a modification to the selected window query based on the filtering criterion, and modify the selected window query to select records matching the filtering criterion. The instructions may be further configured to modify the available window query to exclude records matching the filtering criterion.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
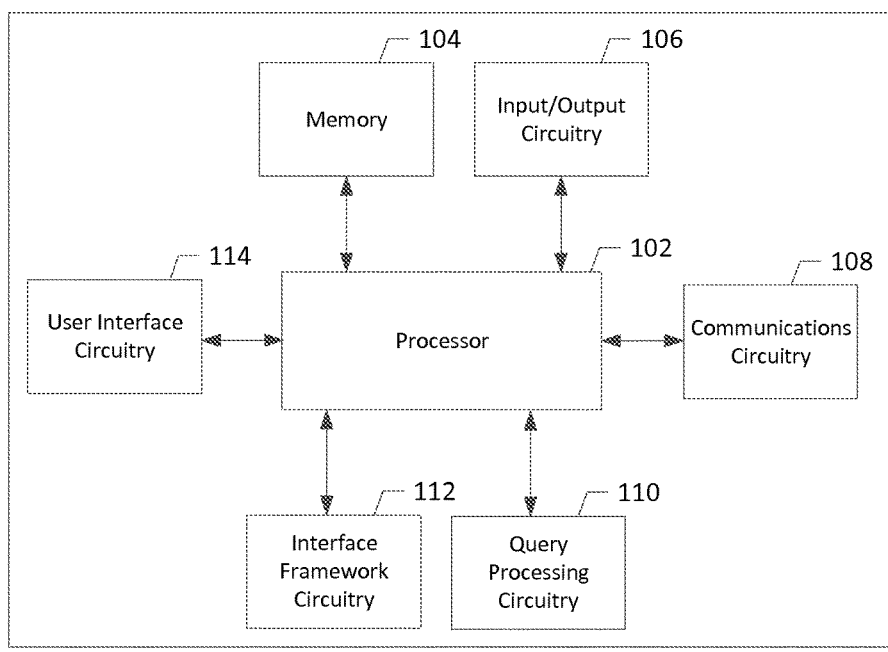
Figure 2:
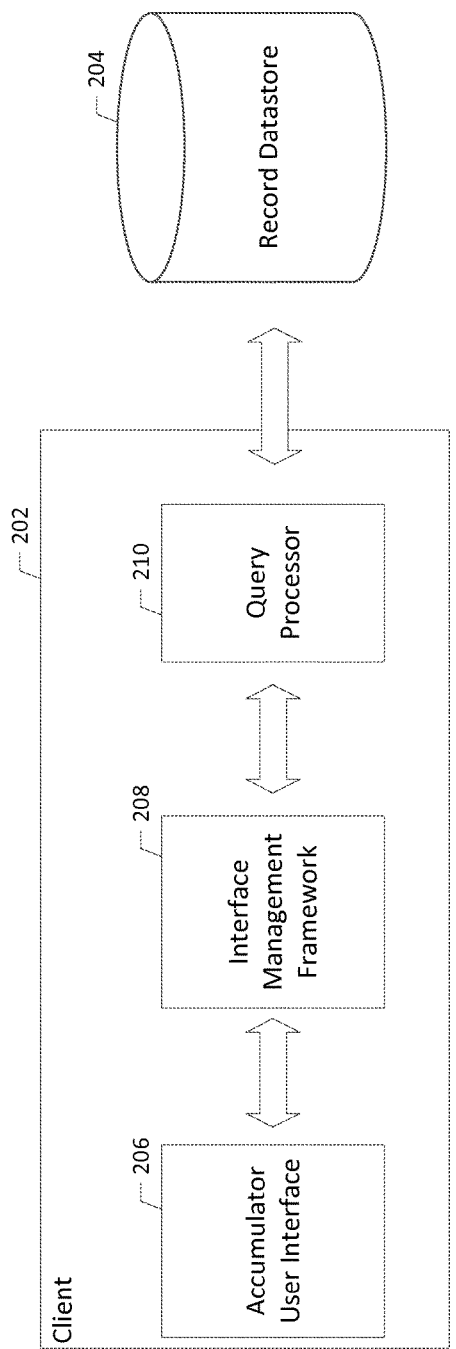
Figure 8:
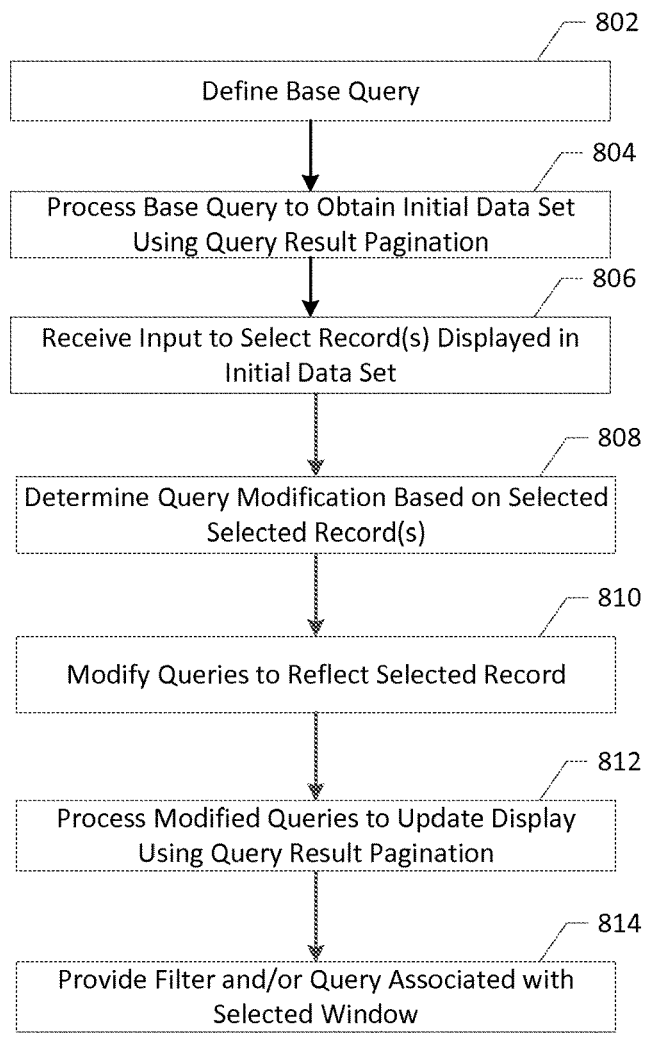
Figure 9:
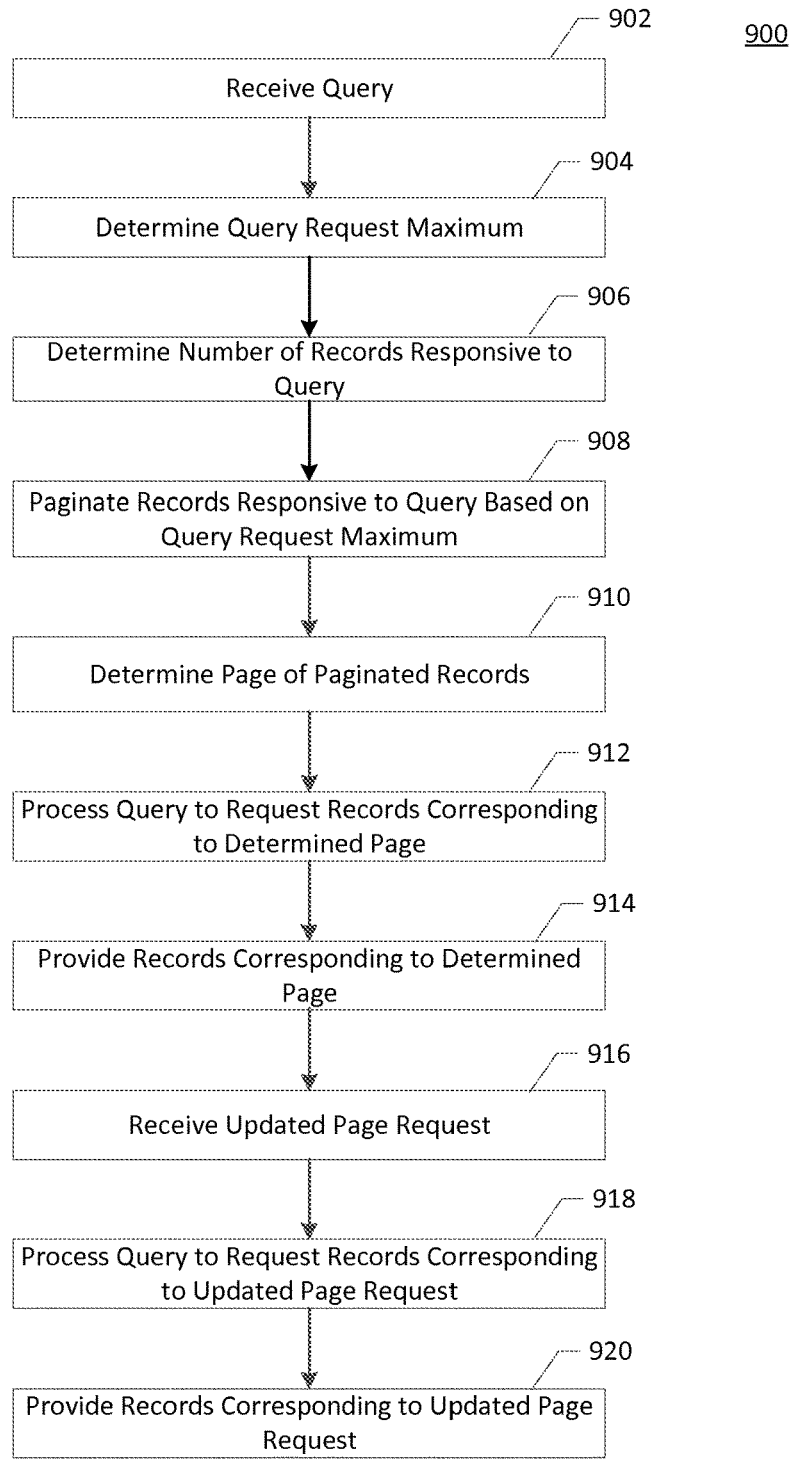

Having thus described certain embodiments of the invention in general terms, reference will now be made to the accompanying drawings, which are not necessarily drawn to scale, and wherein:

FIG. 1 is a block diagram of an apparatus for providing an infinitely scrolling accumulator that may be specially configured in accordance with example embodiments of the present invention;

FIG. 2 is a block diagram of a dataflow between logical components of a computing device providing an infinitely scrolling accumulator in accordance with example embodiments of the present invention;

Figure 5:
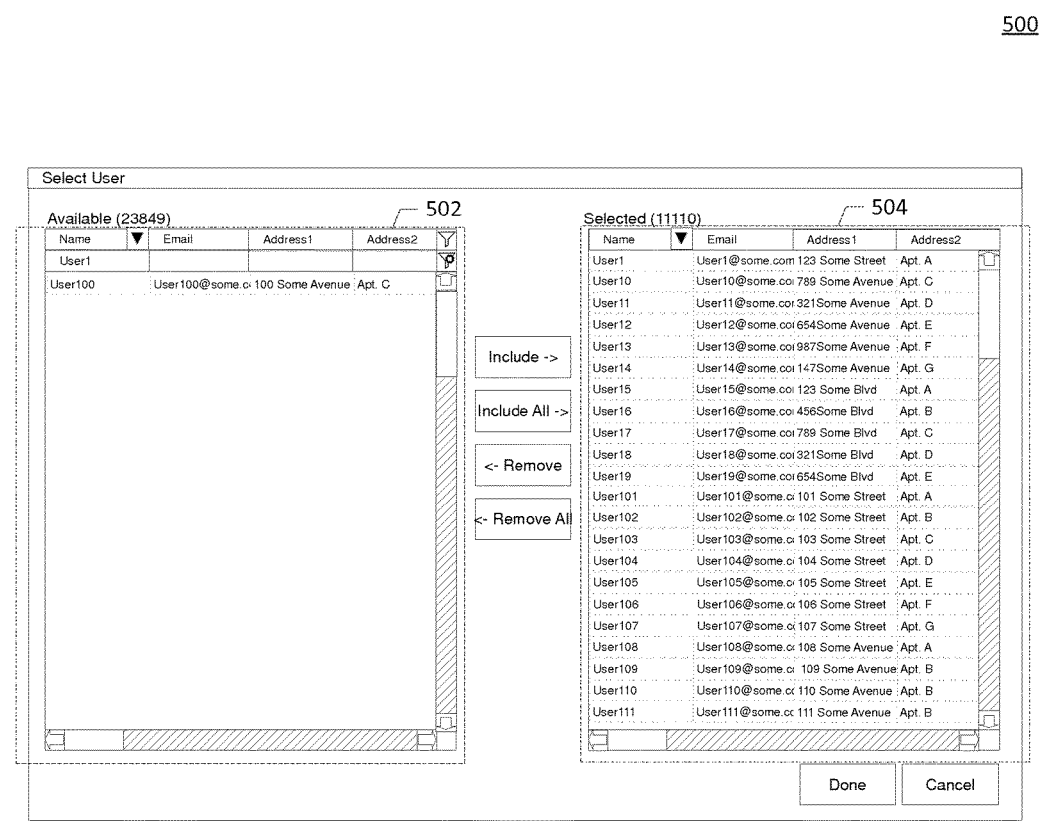
Figure 7:
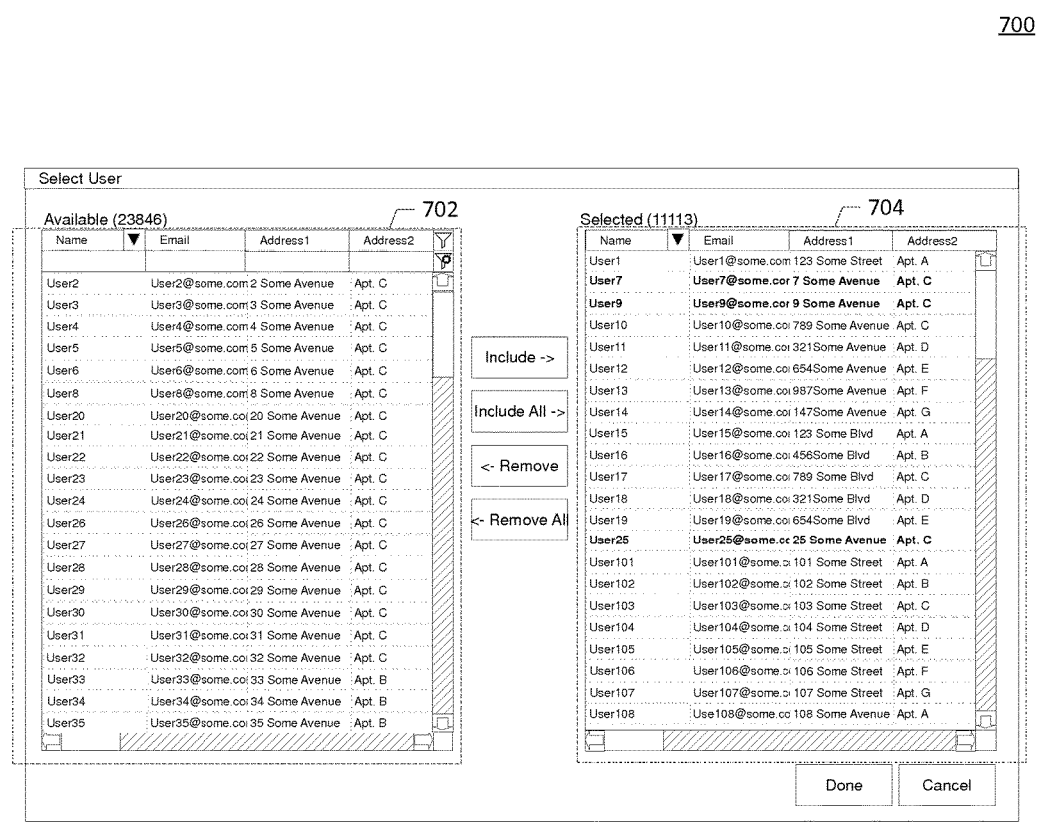

FIGS. 3-7 are illustrations depicting exemplary interfaces for implementing an infinitely scrolling accumulator interface control in accordance with example embodiments of the present invention;

FIG. 8 is an illustration depicting a flow diagram of a process for implementing an accumulator in accordance with example embodiments of the present invention; and FIG. 9 is an illustration depicting a flow diagram of a process for implementing infinite scrolling in an accumulator in accordance with example embodiments of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

INTRODUCTION AND DEFINITIONS

A method, apparatus and computer program product are provided in accordance with example embodiments of the present invention to provide an infinitely scrolling accumulator computer interface control. As noted above, the inventors have identified that current interface controls are inadequate in that loading large numbers of records into a display window causes performance issues, while the use of accumulator interface controls are not amenable for use with prior art infinite scrolling techniques due to the need to track a complete list of records that correspond to each display window (e.g., selected and unselected records). In this regard, the inventors have developed systems that provide for infinitely scrolling accumulator interface controls while still maintaining accurate data regarding which records are selected and not selected, while simultaneously generating simplified queries to control which records are displayed in accumulator windows without the need to use overlong, inefficient queries. The inventors have also developed novel systems for managing display of records responsive to these queries using infinite scrolling design patterns.

To support this novel functionality, the inventors have developed various novel interface controls, interface control frameworks, and management processes that allow for implementation of an infinitely scrolling accumulator as described herein. These assets may serve to implement a series of filters applied to an underlying base query in order to manage which records are available for selection via the accumulator interface control at any given time. In some embodiments, a separate interface layer or framework may modify outgoing queries to enable infinite scrolling techniques, such as processes that serve to paginate record results from a query and to request only particular pages for display at any given time. Embodiments may serve to support a graphical user interface (GUI) that enables a user to interact with the accumulator interface control.

For the purposes of this disclosure, the term "accumulator" is understood to refer to a particular interface control having at least two windows for display of records and one or more interface controls for selection of records to move to or from each of the two windows. Such windows may typically be associated with "available" records (i.e., records available for selection) and "selected" records (i.e., records that have been marked, clicked, or otherwise moved from a list of available records to a list of selected records), though it should be appreciated that some accumulators may include more than two windows, such as where records may be moved to one of two or more particular selection lists. An accumulator may also include other interface controls to select, sort, and filter data (e.g., text boxes for entering filter criteria, the ability to click on columns to sort displayed records, etc.), and interface controls to control for movement of multiple records at a time (e.g., select all, add all, and/or remove all buttons, etc.).

For the purposes of this disclosure, the term "infinite scroll" refers to a design pattern in which a list of records is provided for display in a piecemeal fashion as a list of records is scrolled. Such design patterns avoid the need to request an entire list of records before beginning display by requesting a subset of records at a time. Additional records may be requested in response to various events, including but not limited to detection of a scroll operation (e.g., performed by using an arrow key, clicking on a scroll bar, dragging an icon on a scroll bar, or the like), detection that a last item of a list of previously requested items is displayed, or according to various other criteria. The term "infinitely scrolling accumulator" should be understood to refer to an accumulator interface control where at least two windows for displaying records implement the infinite scroll design pattern.

Exemplary Client Apparatus

FIG. 1 illustrates a block diagram of an apparatus 100 in accordance with some example embodiments. The apparatus 100 may be any computing device capable of providing an infinitely scrolling accumulator interface control as described herein. For example, the apparatus 100 may be implemented as any device capable of providing a graphical user interface and receiving input via that graphical user interface. In some embodiments, the apparatus 100 may include a display and input devices (e.g., mice, keyboards, touch screens, etc.) for providing the graphical user interfaces, while in other embodiments the apparatus 100 may function as a server providing the graphical user interface to another apparatus which functions as a client device (e.g., where the server provides remote access capabilities such as over a network). In the interests of brevity, the apparatus 100 is described as both generating the GUI and receiving inputs to the GUI, but it should be readily appreciated that the GUI may, in some embodiments, be provided to a separate client device by the apparatus and input may be provided via the client device and routed to the apparatus via various types of data connections (e.g., wirelessly, through WiFi or Bluetooth, over Ethernet, via parallel or serial cables, via a Universal Serial Bus (USB) cable, or any other communication method).

The apparatus 100 may be implemented as a standalone or rack-mounted server, a desktop computer, a laptop computer, a personal digital assistant, a tablet computer, a netbook computer, or the like. Accordingly, it will be appreciated that the apparatus 100 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

As illustrated in FIG. 1, an apparatus 100 may include a processor 102, a memory 104, input/output circuitry 106, communications circuitry 108, query processing circuitry 110, interface framework circuitry 112, and user interface circuitry 114. The apparatus 100 may be configured to implement the interfaces described below with respect to FIGS. 3-7 and to execute the operations described below with respect to FIGS. 2 and 8-9. Although these components 102-114 are described with respect to functional limitations, it should be understood that the particular implementations necessarily include the use of particular hardware. It should also be understood that certain of these components 102-114 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 100 may provide or supplement the functionality of particular circuitry. For example, the processor 102 may provide processing functionality, the memory 104 may provide storage functionality, the communications circuitry 108 may provide network interface functionality, and the like.

In some embodiments, the processor 102 (and/or co-processor or any other processing circuitry assisting or otherwise associated with the processor) may be in communication with the memory 104 via a bus for passing information among components of the apparatus. The memory 104 may be non-transitory and may include, for example, one or more volatile and/or non-volatile memories. In other words, for example, the memory may be an electronic storage device (e.g., a computer readable storage medium). The memory 104 may be configured to store information, data, content, applications, instructions, tables, data structures, or the like, for enabling the apparatus to carry out various functions in accordance with example embodiments of the present invention.

The processor 102 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 102 may be configured to execute instructions stored in the memory 104 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 100 may include input/output circuitry 106 that may, in turn, be in communication with processor 102 to provide output to the user and, in some embodiments, to receive an indication of a user input. The input/output circuitry 106 may comprise a user interface and may include a display and may comprise a web user interface, a mobile application, a client device, a kiosk, or the like. In some embodiments, the input/output circuitry 106 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 104, and/or the like).

The communications circuitry 108 may be any means such as a device or circuitry embodied in either hardware or a combination of hardware and software that is configured to receive and/or transmit data from/to a network and/or any other device, circuitry, or module in communication with the apparatus 100. In this regard, the communications circuitry 108 may include, for example, a network interface for enabling communications with a wired or wireless communication network. For example, the communications circuitry 108 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The query processing circuitry 110 includes hardware configured to interface with one or more databases and to cause execution of queries against those databases. The query processing circuitry 110 may include, for example, an application programming interface for transmitting queries to a database server. Alternatively, in some embodiments, the apparatus 100 may implement a database, and the query processing circuitry 110 may be configured to execute queries against tables of the local database, such as through a database application. The query processing circuitry 110 may thus include one or more network interfaces, buses, shared memories, or the like for notifying a database application or database server of a query to be processed. The query processing circuitry 110 may also include a processor for managing one or more applications, processes, threads, or the like for receiving results of the query from the database, storing the results of the query, managing communications with the database, and/or the like. In some embodiments, the query processing circuitry 110 may be integrated with the interface framework circuitry 112, such as where the interface framework circuitry 112 transmits queries directly to a database for execution. The query processing circuitry 110 is therefore implemented using hardware components of the apparatus configured by either hardware or software for implementing these planned functions.

The interface framework circuitry 112 includes hardware configured to manage content of a GUI displayed on a display device and interacted with via one or more input devices. In some exemplary embodiments, the interface framework circuitry 112 is configured to receive requests for one or more records to include in a GUI, and to determine the manner in which those records should be split up to be efficiently displayed in the GUI. For example, the user interface circuitry 114 may display an accumulator interface control that is configured to select from a large number of records from a database (e.g., 10,000 or more records, though it should be appreciated that different interfaces may have varying capabilities for display of varying numbers of records, such that a "large number" may be determined based on the performance characteristics of the particular interface control, database server and/or the computing device operating the interface). The interface framework circuitry 112 may receive the request for the large number of records and format a query that requests a subset of the number of records. In some embodiments, the interface framework circuitry 112 may determine a total number of records responsive to a query received from the user interface circuitry 114, and divide that total number of records into pages based on a predefined number of records (e.g., 50, 100, or 200 records) known not to cause performance problems for the user interface circuitry 114, database, or other components of the system. The interface framework circuitry 112 may be further configured to receive notification of particular events that occur in an interface control provided by the user interface circuitry 114. For example, a notification may be generated to the interface circuitry 114 in response to a scroll event (e.g., clicking on a scroll bar, pressing a down arrow key, or dragging an icon on a scroll bar) occurring in the user interface circuitry 114, upon reaching the end of a list of displayed records (e.g., reaching the bottom of a list), or the like, and, in response, the interface framework circuitry 112 may forward a new query to the query processing circuitry 110 to request another set of records. For example, upon receiving a notification that a scroll event has occurred to the bottom of a list of displayed records, the interface framework circuitry 112 may generate a query for a next page of paginated records to be processed by the query processing circuitry 110. The interface framework circuitry 112 may also be configured to manage one or more filters for determining which records to display in an accumulator interface control and one or more queries for identifying selected records and available records. Embodiments of methods and systems for employing these techniques are described further below with respect to FIGS. 2-9.

To perform these functions, the interface framework circuitry 112 is implemented by one or more processors executing one or more applications, threads, callback functions, or the like to provide records to the user interface circuitry 114, to determine queries to obtain records, and to cause queries to be executed by the query processing circuitry 110. The processor of the interface framework circuitry 112 may be an independent processor, ASIC, or FPGA, or access to other system components, such as the processor 102 and memory 104 may be leveraged to implement the interface framework circuitry 112. The interface framework circuitry 112 is therefore implemented using hardware components of the apparatus configured by either hardware or software for implementing these planned functions.

The user interface circuitry 114 includes hardware configured to generate a GUI comprising an accumulator interface control. For example, the user interface circuitry 114 may include display devices, input devices (e.g., touch screens, mice, keyboards, etc.), and other components for viewing and interacting with a GUI. In other embodiments, the user interface circuitry 114 may include processors and network interfaces for providing GUI information to a remote device and for receiving input from the remote device that comprises interactions with the GUI displayed on the remote device. The user interface circuitry 114 may interface with the interface framework circuitry 112 to determine a set of records for display in an accumulator, and the interface framework circuitry 112 may be responsible for providing those records to the user interface circuitry 114. In some embodiments, interactions with the GUI provided by the user interface circuitry 114 (e.g., scroll events, selection of records, input of filter criteria, and the like) are provided by the user interface circuitry 114 to the interface framework circuitry 112. In some embodiments, the user interface circuitry 114 is provided by one or more processes or applications executing on a processor, such as the processor 102. It should be appreciated that while the user interface circuitry 114 and the interface framework circuitry 112 are generally described as separate components of the apparatus 100, some embodiments may include the functionality of both. Various exemplary accumulator interface controls and the underlying processing employed by the user interface circuitry 114 and the interface framework circuitry 112 are described further below with respect to FIGS. 2-9.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

Example Infinitely Scrolling Accumulator Interface Framework Data Flow

FIG. 2 is an illustration of an example of a data flow 200 for providing an infinitely scrolling accumulator in accordance with example embodiments of the present invention. The data flow 200 illustrates communications between and among components of a client 202 implementing an infinitely scrolling accumulator to perform operations on records included in a record datastore 204. The client 202 includes an accumulator user interface 206, an interface management framework 208, and a query processor 210.

The accumulator user interface 206 functions as a front-end GUI, which may be interacted with by a user of the client. The accumulator user interface 206 may include applications, processes, libraries, and the like to implement a series of GUI objects such as windows, scroll bars, buttons, text entry fields, and the like. In some embodiments, these GUI objects are implemented according to various operating system constructs, shared libraries, and the like, while in other embodiments these objects are provided by special-purpose hardware and/or software. These GUI objects provide functionality that allows a user to interact with the accumulator user interface.

As the user interacts with the accumulator user interface 206, notifications of those interactions are provided to the interface management framework 208. In this regard, the interface management framework 208 tracks events that occur within the accumulator user interface 206 such as click events, text entries, scroll events, button selections, and the like. Based on these events, the interface management framework 208 takes appropriate action to implement the various functionalities of the infinitely scrolling accumulator. To implement the infinitely scrolling functionality of the infinitely scrolling accumulator, the interface management framework 208 may generate one or more queries to request records from the record datastore for inclusion within one or more windows or selection boxes of the accumulator user interface 206. These queries may include a request for a record count that is responsive to a particular query and operations to paginate results of that particular query. The interface management framework 208 also maintains a base query for population of the infinitely scrolling accumulator, and the base query may be modified as records are selected or removed from particular selection windows of the infinitely scrolling accumulator. The interface management framework 208 may also monitor and implement filters to filter records listed in the selection windows of the infinitely scrolling accumulator, and these filters may be employed to edit the queries associated with each selection window in circumstances where a filter directly corresponds to records added or deleted from a particular window (e.g., where a "select all" or "remove all" interface control is utilized to select or remove all records that correspond to a particular filter). Queries generated by the interface management framework 208 may be provided to the query processor 210.

The query processor 210 is configured to process and/or execute one or more queries against the record datastore 204. As such, the query processor 210 may include an application programming interface or database client that is operable to receive a query from the interface management framework 208 and return records that are responsive to that query. In some embodiments, the query processor 210 may transmit the query to a database server, while in other embodiments the query processor 210 may be a database server itself and execute the query itself. In some embodiments, some or all of the functionality of the query processor may be incorporated into the interface management framework 208, such as in the case where a database access API is utilized within the interface management framework 208 without employing a separate database access module.

The record datastore 204 may be any database or data structure operable to store a plurality of data records and be queried to retrieve, edit, delete, or modify those records. The record datastore 204 may both provide records for viewing and selecting in the infinitely scrolling accumulator and be modified by operations of the infinitely scrolling accumulator (e.g., where the infinitely scrolling accumulator is utilized to select particular records for editing or deletion).

Exemplary Infinitely Scrolling Accumulator Interfaces and Associated Query Processing FIGS. 3-7 illustrate the operation of an exemplary infinitely scrolling accumulator in accordance with embodiments of the present invention. These figures highlight how records may be added and removed from each selection window of the infinitely scrolling accumulator. As records are added and removed, underlying filters and/or queries are updated accordingly in a manner that preserves the ability to infinitely scroll, and thus provide a substantial performance benefit by only requesting a small set of records at a given time, while still preserving the status of all associated selected and/or available records. Embodiments also utilize filtering techniques to provide users with enhanced functionality while modifying queries in an intelligent, efficient manner to ensure that queries may be processed by a database in a reasonable amount of time.

Figure 3:
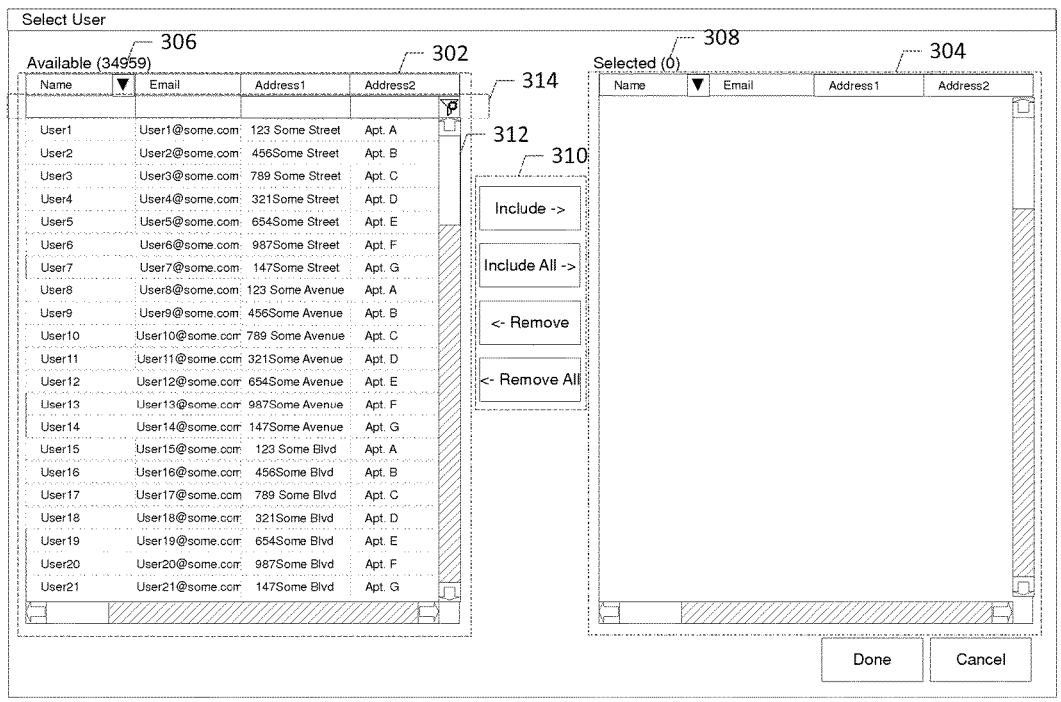

FIG. 3 illustrates an infinitely scrolling accumulator 300 in accordance with some embodiments. The infinitely scrolling accumulator 300 includes an available window 302 and a selected window 304. The available window 302 lists records that are available for selection, and the selected window 304 lists records that have been selected. Each of the available window 302 and the selected window 304 are implemented as infinitely scrolling windows, in that as the corresponding windows are scrolled, records are requested from the database in a piecemeal manner to avoid overloading the user interface with too many records, which may cause performance problems. In order to maintain an accurate list of which records are associated with each window, the infinitely scrolling accumulator may maintain a query associated with each window. The infinitely scrolling accumulator 300 may also include an available count 306 of records associated with the available window 302, and a selected count 308 associated with the selected window 304.

In the present example illustration, it can be seen that the available window 302 is associated with 34,959 records. Attempting to load all of these records into the interface at once would require a large memory footprint to receive the results from the database, and while the available window 302 was populated, the interface would likely grind to a halt. Instead, by using an infinitely scrolling design pattern, a count of the records may be received and as the available window 302 is scrolled using a scroll bar control 312, individual pages of records may be accessed from the database, such as by requesting 50 or 100 records at a time. To support this scrolling model, embodiments may track interactions with the scroll bar control 312 to determine which page of records to access. For example, if the scroll bar control is selected by the user to scroll to the next page (e.g., by clicking on the scroll bar below a scroll control box), then the next page of records may be requested from the database and loaded into the available window 302. Alternately, if the scroll bar control 312 is manipulated to move to the end of the list (e.g., by dragging the scroll control box to the end of the list in one motion), then the last page of records may be requested and loaded into the available window 302. It should be appreciated that an underlying interface framework as described above with respect to FIG. 2 may track the relative positioning of the scroll control box, the number of available records, and a number of records per page to determine which records to request from the database and display within the available window.

The infinitely scrolling accumulator 300 may also include a series of interface controls 310 that serve to move records from one window to the other. For example, selecting one or more records from the available window 306 (e.g., by clicking or ctrl+clicking the records) and then selecting an "include" control may move those selected records to the selected window. Selecting an "include all" control may move all records presently displayed in the available window 302 to the selected window. Similarly, the "remove" and "remove all" controls may work to move items clicked or otherwise selected in the selected window 304 back to the available window. Alternatively, in some embodiments selecting the "include all" control may move all records that match a filter associated with the available window 302 to the selected window, and vice-versa with respect to the "remove all" control. Selection of records in this manner also causes changes to the underlying queries used to populate each window so that records are included and excluded appropriately.

A base query may be employed that represents the entire data set being interacted with by the infinitely scrolling accumulator 300. However, in order to improve performance, this base query may not be used to load all records into the interface control at once. Instead, the base query may be modified according to filters applied to the entire set of data and managed by an interface framework to reduce the number of records loaded into memory at any given time while still providing the ability to select any record within the database. To that end, embodiments may employ a set of filters defined by interactions with the interface control to modify the base query to manipulate the records displayed in each of the available window 302 and the selected window 304. These filters may be updated both by application of filtering techniques (e.g., through the use of filtering controls 314 as described below), or through the selection and removal of particular records from each window. Embodiments of an interface framework may utilize these filters to modify the underlying queries associated with each window, and thus effect changes in the displayed records.

As noted above, each of the available window 302 and the selected window 304 may be associated with a particular query. These queries may dynamically populate each of the available window 302 and the selected window 304. In this manner, moving an item from the available window 302 to the selected window 304 may not actually associate the item from one window to the other, but instead modify an underlying query so that the item is included in the query associated with the selected window but excluded from the query associated with the available window. Query results may be refreshed as changes are made to each window, such that requests to the server for new data are sent in response to changes within the windows 302 and 304. In this manner, embodiments may improve data freshness by retrieving records directly from the database as opposed to managing changes locally before propagation to the database.

Each window may also include a set of filter controls 314. The filter controls 314 may provide additional filters to reduce the number of records displayed I the window at any given time. These filters may be used in conjunction with items previously selected or removed from the windows to generate a set of filters in an appropriate format, such as in JavaScript Object Notation (JSON) format. These filters may be used by an interface framework to generate a corresponding query for each window to determine which records to display in each window. In the present example, the filter controls 314 are blank, so an associated set of filters for the available window 302 might be:

TABLE 1

[{
   group : 0,
   property : 'id',
   operator : 'like',
   value : '',
   type : 'string'
}].

And an associated set of filters for the selected window 304 might be:

TABLE 2

[{
   group : 1,
   property : 'id',
   operator : 'not like',
   value : '',
   type : 'string'
}].

In the present example, the "group" identifier may be employed to identify sets of criteria that must all be met for inclusion in the corresponding window. Sets of filters with the same group identifier may thus be used to simulate a logical AND operation, and mapping these filters to an underlying query may result in the use of such a logical AND operation. Different group identifiers may be used to simulate a logical OR operation, where a record passes the filter (and thus is displayed) if the record meets the filter criteria for the all of the filters of any one group. As used in this example, the "property" identifier identifies a particular column or field name. The property identifier may, for example, be associated with a particular column header of the corresponding display window, and that column header may function as an alias to be mapped to one or more fields of the underlying database. Alternatively, the property identifier may identify the appropriate fields of the database directly.

As used herein, the "operator" identifier specifies the operation that is to be performed on the identified property to form a predicate for the underlying query. In some embodiments, the operator identifier may correlate to a particular query operation (e.g., a Structured Query Language operation), though in other embodiments the operator identifier may not have a direct query operation analog and may be implemented by a series of separate query operators. As used herein, the "value" identifier names the particular text, number, or other data for the identified property that must be matched to meet the filter criteria. The "type" identifier indicates a data type for the value identifier. The type identifier may be used to perform a validation of the data type used for the value field before generating and/or executing an underlying query. For example, if the data type is a range of values, then a "like" or "not like" operator type would not be appropriate, while it would be appropriate for a "data range" operator type.

Since the present example illustrates all records being listed in the available window 302 and no records in the selected window 304, the query for the available window 302 may be as follows:

TABLE 3

SELECT *
FROM USERS
WHERE id LIKE '%'.

And the query for the selected window 304 may be as follows:

TABLE 4

SELECT *
FROM USERS
WHERE id NOT LIKE '%'.

As records are added to the selected window 304, the filters and underlying query for the selected window are updated to add those selected records to the selected window. The filters and query for the available window 302 may be similarly modified to set an "except" parameter on the records added to the selected window 304, so that those records are no longer displayed within the available window.

As records are added and removed from each of the available window 302 and selected window 304, the filters and underlying queries are updated to reflect the changes. It should be appreciated that processes and components within the user interface may be configured to determine the appropriate modification to each query based on the interactions performed with the accumulator interface. For example, selection of an "include all" or "remove all" control would cause a select statement to be appended to the query corresponding to the active filters on the window from which the records are being added, and a reciprocal select statement with reversed criteria (e.g., select if NOT the filter criteria, or through the use of an EXCEPT operator appended to the original SELECT statement) being added to the query for the window from which the records are being removed. Similarly, if individual records are selected for inclusion or removal, corresponding select statements may be added to the query associated with the window to which those records are being moved, and reciprocal select statements may be added to the window from which those records are being removed. Techniques for using such filters to modify the underlying query are described further below with respect to FIGS. 4-7.

Figure 4:
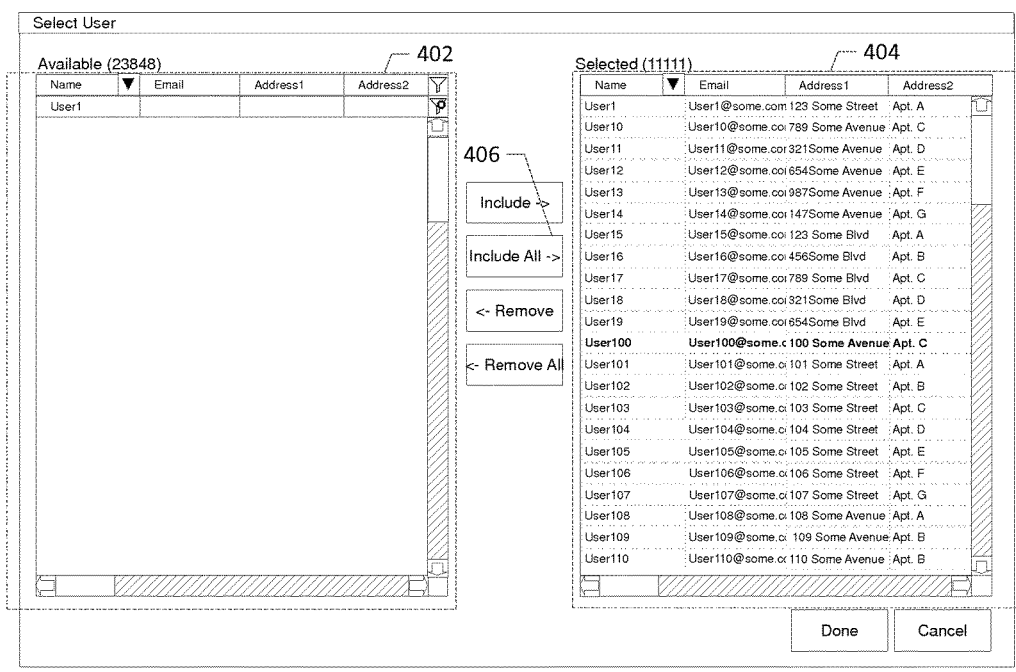

FIG. 4 illustrates an example of an operation that filters an available window 402 by the text string "user1" and then moves all items that are responsive to the filter to the selected window 404, such as by use of an include all control 406. In response, the query associated with the available window 402 is modified to exclude the records responsive to the filter, and the query associated with the selected window 404 is modified to include the records responsive to the filter. As such, the filter for the available window 402 could be structured as follows:

TABLE 5

[{
  group : 0,
  property : 'id',
  operator : 'like',
  value : '',
  type : 'string'
},{
  group : 0,
  property : 'name',
  operator : 'like',
  value : 'User1',
  type : 'string'
},{
  group : 1,
  property : 'id',
  operator : 'not like',
  value : '',
  type : 'string'
},{
  group : 2,
  property : 'name',
  operator : 'like',
  value : 'User1',
  type : 'string'
}]

The corresponding filters used to generate the query for the selected window would be as follows:

TABLE 6

[{
  group : 1,
  property : 'id'
  operator : 'not like',
  value : '',
  type : 'string'
},{
  group : 2,
  property : 'name',
  operator : 'like',
  value : 'User1',
  type : 'string'
}]

Upon selecting "include all", the query for the available window 402 would be modified to remove any of the records that match the active filter. As such, the query for the available window 402 would read as follows:

TABLE 7

SELECT *
FROM USERS
WHERE id LIKE '%'
AND name LIKE 'User1%'
EXCEPT
SELECT *
FROM USERS
WHERE id NOT LIKE '%'
OR name LIKE 'User1%'

The query for the available window 402 illustrated in Table 7 thus applies the previously entered filtered through the use of a SELECT operation that identifies users matching "User1%", but then applies an EXCEPT operation on the records that were added to the selected window 404 in response to the selection of the include all control 406. As a result, the set of records returned in response to this query is the null set, since the query includes an exception for all records that were displayed prior to the selection of the include all control 406.

The query for the selected window would also be modified to add the records that match the active filter. As such, the query for the selected window 404 would read as follows:

TABLE 8

SELECT *
FROM USERS
WHERE id NOT LIKE '%'
OR name LIKE 'User1%'

The query for the selected window 404 illustrated in Table 8 thus includes a first SELECT operation that identifies the records that were previously included in the window (the null set) and a SELECT operation that returns all records which matched the filter criteria for the available window 402. As a result, the query selects both the null set (where the id is not like "%") and records with a name field that matches "User1%".

Since the accumulator interface 400 is aware of the filter being applied to the available window 402, the modification to the query may be made such that a more efficient query corresponding to the filter (i.e., select all records matching "user1") is used rather than individually adding every record listed in the available window to the query separately (i.e., select "user1", select "user11", select "user12", etc.) thus avoiding using a query that includes thousands of individual select criteria for a single set of users.

In response to updating the queries, the queries may be executed against the database again to update the corresponding data. It should be appreciated that the underlying interface framework may modify and control these queries to implement the infinite scrolling design pattern, such that records that are responsive to the queries are requested in a paginated and piecemeal fashion where appropriate. For example, since 11,111 records are listed as responsive to the query for the selected window 404, only a subset (e.g., 50 records, 100 records, or 1,000 records) might be requested at any given time based on the configuration of the framework for controlling infinite scrolling, and as the list of records is scrolled other records may be requested as appropriate.

FIG. 5 illustrates an example of an operation to move a record from a selected window 504 back to an available window 502. As noted above, records may be freely moved between an available window and a selected window. In the case illustrated in FIG. 5, all records including the test string "user1" have been moved to the selected window, but then one record, "user100" was removed from the selected window. Accordingly, the JSON data would be modified to indicate that "user100" should be added back to the available window 502 and removed from the selected window 504, causing an update to underlying queries associated with each window would be updated to reflect that "user100" should be excluded from the selected window 504 and placed back in the available window 502.

The JSON filter structure for the available filter 502 would thus be updated as follows:

TABLE 9

```
[{
  group : 0,
  property : 'id',
  operator : 'like',
  value : '',
  type : 'string'
},{
  group : 0,
  property : 'name',
  operator : 'like',
  value : 'User1',
  type : 'string'
},{
  group : 1,
  property : 'id',
  operator : 'not like',
  value : '',
  type : 'string'
},{
  group : 1,
  property : 'name',
  operator : 'not in',
  value : ['User100'],
  type : 'list'
},{
  group : 2,
  property : 'name',
  operator : 'like',
  value : 'User1',
  type : 'string'
},{
  group : 2,
  property : 'name',
  operator : 'not in',
  value : ['User100'],
  type : 'list'
}]
```

The JSON filter structure for the selected window 504 would be updated as follows:

TABLE 10

```
[{
  group : 1,
  property : 'id',
  operator : 'not like',
  value : '',
  type : 'string'
},{
  group : 1,
  property : 'name',
  operator : 'not in',
  value : ['User100'],
  type : 'list'
},{
  group : 2,
```

TABLE 10-continued

```
  property : 'name',
  operator : 'like',
  value : 'User1',
  type : 'string'
},{
  group : 2,
  property : 'name',
  operator : 'not in',
  value : ['User100'],
  type : 'list'
}]
```

As such, the query for the available window 502 would be modified to read as follows:

TABLE 11

```
SELECT *
FROM USERS
WHERE id LIKE '%'
  AND name LIKE 'User1%'
EXCEPT
SELECT *
FROM USERS
WHERE (id NOT LIKE '%'
    AND name NOT IN ('User100') )
  OR (name LIKE 'User1%'
    AND name NOT IN ('User100') )
```

The query for the selected window 504 would be modified to read as follows:

TABLE 12

```
SELECT *
FROM USERS
WHERE (id NOT LIKE '%'
    AND name NOT IN ('User100') )
  OR (name LIKE 'User1%'
    AND name NOT IN ('User100') )
```

Modifying the queries in this manner has the effect of removing the "user100" record from the selected window 504 and placing it back within the available window 502. It should also be appreciated that while the instant example depicts filters being applied to only the available window 502, alternative embodiments may include similar filtering capability applied to the selected window 504. In such cases, filters applied to the selected window may be used to modify the records displayed in the selected window 504, and selection of corresponding interface controls (e.g., a "remove all" interface control) may result in these filters affecting the filters and underlying queries for both the selected window 504 and the available window 502 in a similar manner by which filters applied to the available window 502 may be used to alter the underlying query of the selected window 504.

It should also be appreciated that some embodiments may include a query optimization process. This query optimization process may analyze the underlying queries for the available window 502 and selected window 504 and eliminate redundant queries or otherwise improve query efficiency. For example, if the result of operations performed within the infinitely scrolling accumulator interface causes the same data to first be included and then be excluded, the underlying query may be more efficient if the corresponding records are never included in the first place.

Figure 6:
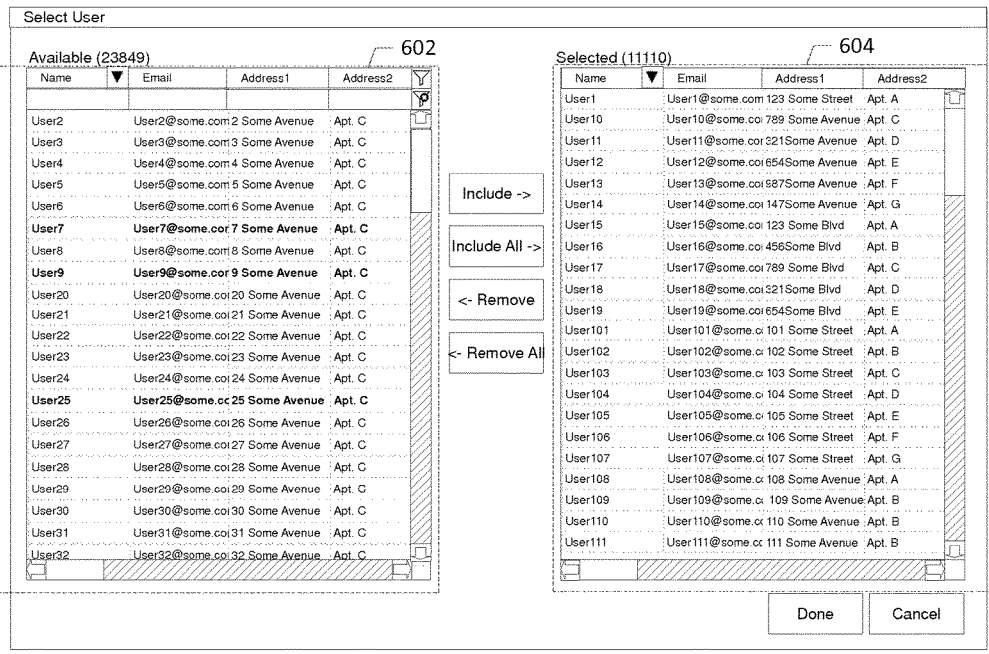

FIG. 6 illustrates an example of the infinitely scrolling accumulator 600 after removing the filter from the available window 602 as previously depicted in FIG. 5, and selecting a subset of the records displayed in the available window 602. In the available window 602, records associated with "user7", "user9" and "user25" are selected. Removing the filter from the available window 602 causes the corresponding filter to be updated as follows:

TABLE 13

```
[{
    group : 0,
    property : 'id',
    operator : 'like',
    value : '',
    type : 'string'
},{
    group : 1,
    property : 'id',
    operator : 'not like',
    value : '',
    type : 'string'
},{
    group : 1,
    property : 'name',
    operator : 'not in',
    value : ['User100'],
    type : 'list'
},{
    group : 2,
    property : 'name',
    operator : 'like',
    value : 'User1',
    type : 'string'
},{
    group : 2,
    property : 'name',
    operator : 'not in',
    value : ['User100'],
    type : 'list'
}]
```

As such, the query corresponding to the available window 602 is also updated to remove the select statement for "user1" caused by the previous filter, such that the query now reads:

TABLE 14

```
SELECT *
FROM USERS
WHERE id LIKE '%'
EXCEPT
SELECT *
FROM USERS
WHERE (id NOT LIKE '%'
    AND name NOT IN ('User100') )
OR (name LIKE 'User1%'
    AND name NOT IN ('User100') )
```

Although the records for "user7", "user9", and "user25" are selected, since there has been no change in the displayed records in either window, no corresponding change is made to the filters or the underlying queries. However, upon selection of the "include" control, the records for "user7", "user9", and "user25" are added to the selected window as illustrated in FIG. 7.

FIG. 7 illustrates an infinitely scrolling accumulator interface 700 based on the previous accumulator interfaces depicted in FIGS. 3-6, with the records for "user7", "user9", and "user25" removed from the available window 702 and added to the selected window 704. As a result, the JSON data structure containing filter data for the available window would be updated as follows:

TABLE 15

```
[{
    group : 0,
    property : 'id'
    operator : 'like',
    value : '',
    type : 'string'
},{
    group : 1,
    property : 'id',
    operator : 'not like',
    value : '',
    type : 'string'
},{
    group : 1,
    property : 'name',
    operator : 'not in',
    value : ['User100'],
    type : 'list'
},{
    group : 2,
    property : 'name',
    operator : 'like',
    value : 'User1',
    type : 'string'
},{
    group : 2,
    property : 'name',
    operator : 'not in',
    value : ['User100'],
    type : 'list'
},{
    group : 3,
    property : 'name',
    operator : 'in',
    value : ['User7',
        'User9',
        'User25'],
    type : 'list'
}]
```

This update reflects the removal of the records "user7", "user9", and "user25" from the available window 702. Similarly, the selected window JSON filters are updated to include these records as follows:

TABLE 16

```
[{
    group : 1,
    property : 'id',
    operator : 'not like',
    value : '',
    type : 'string'
},{
    group : 1,
    property : 'name',
    operator : 'not in',
    value : ['User100'],
    type : 'list'
},{
    group : 2,
    property : 'name',
    operator : 'like',
    value : 'User1',
    type : 'string'
},{
    group : 2,
    property : 'name',
    operator : 'not in',
    value : ['User100'],
    type : 'list'
},{
    group : 3,
    property : 'name',
    operator : 'in',
    value : ['User7',
        'User9',
        'User25'],
```

TABLE 16-continued

```
    type : 'list'
  }]
```

This modification to the filter criteria for the selection window illustrates the inclusion of the three referenced records.

In response to updating the filters, the underlying queries are also updated. The query for the available window 702 would thus be updated as follows to reflect the removal of records "user7", "user9", and "user25":

TABLE 17

```
SELECT *
FROM USERS
WHERE id LIKE '%'
EXCEPT
SELECT *
FROM USERS
WHERE (id NOT LIKE '%'
   AND name NOT IN ('User100') )
OR (name LIKE 'User1%'
   AND name NOT IN ('User100') )
OR (name IN ('User7', 'User9', 'User25') )
```

The query for the selected window 704 would be updated as follows to reflect the addition of the records "user7", "user9", and "user25":

TABLE 18

```
SELECT *
FROM USERS
WHERE (id NOT LIKE '%'
   AND name NOT IN ('User100') )
OR (name LIKE 'User1%'
   AND name NOT IN ('User100') )
OR (name IN ('User7', 'User9', 'User25') )
```

The end result of any of these data manipulations is a list of filter criteria for each window and a corresponding set of queries for the records included in each window. Upon selection of a "save", "done," or "complete" interface control, the filter criteria and/or query for the selected window may be used to generate a data structure to be sent to a calling process or other system utilizing the infinitely scrolling accumulator to identify the records associated with the window. This data structure may include the filter criteria and queries formatted in a manner that is suitable for consumption by an external process. For example, this data structure may be a JSON structure comprising the filter criteria and queries, along with metadata related to an original request that spawned the associated accumulator window. This data structure may be used to generate a query or perform other operations with respect to the database. Alternatively, in some embodiments the query associated with the selected window may be sent as a result of using the accumulator interface control.

Exemplary Processes for Implementing an Infinitely Scrolling Accumulator Interface Control FIG. 8 depicts a flow diagram of a computer-implemented process for implementing an infinitely scrolling accumulator interface control in accordance with embodiments of the present invention. In particular, FIG. 8 illustrates processes that are able to implement an interface control that provides the advantages of the "infinite scroll" design pattern while still providing a flexible, efficient, high-performance interface for interacting with records stored in a database. By utilizing filters derived from interactions with the interface to manipulate underlying queries, embodiments may serve to provide the performance benefits of an infinitely scrolling interface without losing underlying record data and while still maintaining data freshness. Embodiments of the process 800 may be performed by an apparatus, such as the apparatus 100 described above, and by components of a client device, such as an interface management framework 208 as described above with respect to FIG. 2.

At action 802, the process 800 defines a base query for a set of data. The base query may be a select statement that selects all of a set of records that are the subject of an accumulator interface. At action 804, the base query may be processed to obtain an initial data set for use with the accumulator interface. However, it should be appreciated that processing of the base query may not, and in fact typically will not, include retrieving all records that are responsive to that query. Implementation of an "infinitely scrolling" design pattern may include determining a number of records that are responsive to that query and only requesting a subset of all records, such as through record pagination. An example of a process for performing such record pagination as part of an infinite scroll operation is described further below with respect to FIG. 9.

In some embodiments, the base query may include two or more reciprocal queries, each associated with a particular window of the infinitely scrolling accumulator. For example, an initial query associated with the available window may include all records, and an initial query associated with the selected window may include no records. Embodiments may also include a set of filters associated with each window, and the filters may be employed to derive the queries associated with each window. At action 808, user input is received to select one or more records displayed in the initial data set. This user input may also include modification to one or more filters applied to one or more of the windows. For example, the user input may select particular records, or apply a filter to reduce the number of displayed records and subsequently select an "include all" control, selecting all of the records to which the filter applies. As these interactions occur, a JSON structure containing each of these filters for each window may be modified accordingly.

At action 810, the queries for each window are modified to reflect the interactions that occurred at action 808, such as changes to the filters for each window. As noted above, these modifications may be reciprocal, such that a record that is removed from an available window is added to a selected window. Alternatively, in some cases the modifications may not be reciprocal, such that the combination of records displayed in both an available window and a selected window is not a superset of all records. For example, when a filter is applied to the available window and used as a basis for selection of records to be added to the selected window, then the filter is cleared and replaced with a different filter, the listed records in each window (and their corresponding underlying queries) would not necessarily include all records that are available for selection unless the different filter was subsequently cleared from the available window. It should be appreciated that, in some embodiments, multiple different selected windows may be employed, such that a superset of the available window and all selected windows covers all records. Accordingly, a modification to the available set would result in a reciprocal modification to one of the selected windows, but not necessarily all of the selected windows.

At action 812, the modified queries are processed to update their associated windows in the infinitely scrolling accumulator. Processing of these queries may be performed using query result pagination as described further below with respect to FIG. 9 to implement the infinitely scrolling design pattern.

At action 814, a "save" control may be selected, which causes the filter and/or query associated with the selected window to be provided as a list of selected items for use by an external or calling process. In this manner, embodiments of the infinitely scrolling accumulator interface control may be employed to select a set of records from a database while still providing the performance benefits associated with the infinite scroll design pattern.

FIG. 9 illustrates a computer-implemented process 900 for implementation of query pagination as part of an infinite scrolling implementation of an infinitely scrolling accumulator in accordance with embodiments of the present invention. The process 900 allows for piecemeal processing of queries to ensure that an accumulator interface does not get overloaded with a record set that is not readily able to be processed by the interface control, which in turn would cause performance problems and a reduced user experience. To this end, the process 900 serves to manage outgoing queries to return a small set of data along with a count of the overall number of records to facilitate an infinite scroll design pattern. Embodiments of the process 900 may be performed by an apparatus, such as the apparatus 100 described above, and by components of a client device, such as an interface management framework 208 as described above with respect to FIG. 2.

At action 902, a query is received. The query may be any query as described herein, such as an initial base query for a data set, or a query associated with a particular window of an accumulator. At action 904, a query request maximum is determined. The query request maximum reflects a maximum number of records to be returned in response to that query. For example, a given interface may only be able to handle 50 records at a time, so the query request maximum would be set at 50. In some embodiments, the query request maximum is provided by the interface that generates the query for processing, since the interface may be aware of how many records it can handle. In other embodiments, the query request maximum may be determined by the component that is implementing the query pagination process. In yet further embodiments, the query request maximum may be determined dynamically based on the capabilities of the client. In still further embodiments, the query request maximum may be determined based on the capabilities of a database processing the query to avoid overloading the database.

At action 906, a number of records that are responsive to the query is determined. For example, a COUNT statement may be employed to return a number of records without retrieving every record responsive to the query. In this manner, the process 900 may determine the overall number of records so as to implement a pagination process.

At action 908, records responsive to the query are assigned to particular pages based on the query request maximum and the number of records. For example, if the query request maximum is 50 and the count of records responsive to the query is 500, then the results would correspond to 10 pages of records. At action 910, a page of these records is identified. The page may be identified based on various criteria. For example, for an initial base query, the first page of query record results may be returned (e.g., page 1). If a scroll event is received indicating that a corresponding window has been scrolled to the end of a page, the next sequential page may be requested. Alternately, if a scroll control is used to select a particular page (e.g., scrolling a scroll bar one third of the way to the bottom), a corresponding page may be selected (e.g., selecting page 3 of 10) rather than a sequential page.

It should also be appreciated that, while the instant example relates to pagination of records responsive to the query using predefined page numbers, alternative embodiments may utilize other mechanisms for selecting a subset of all responsive records to be loaded. For example, embodiments may monitor a position identifier such as a cursor position or display window position and use the position identifier to select a particular subset of records (e.g., the next 10 records, 25 records, or 50 records) after the record at the cursor position or after the first record displayed within the display window. In such embodiments, rather than focus on predefined pages of records, the records displayed in the window may be dynamically selected. For example, if record 123 of 200 is displayed at the top of the display window and the query request maximum is 50, then records 123-172 may be loaded into the display window. In this manner, embodiments may update as each record is selected or scrolled, rather than upon reaching the "end" of a particular page of records.

Various embodiments of techniques for performing these piecemeal record requests may include parameters for sorting responsive records, setting page limits (e.g., the query request maximum described above), selecting a subset of records to be loaded (e.g., a position identifier or page number as described above), and filtering responsive records (e.g., filters and filtering criteria as described above).

At action 912, a query is processed to determine the records associated with the page. For example, rather than requesting an entire data set, if page 3 of a set of records with a query request maximum for 50 is specified at action 910, then records 101-150 of the result set may be requested. At action 914, the records are received and provided in response to the query. At action 916, an updated request is received for a different page, such as where a scroll operation has occurred or the like. In response, at action 918 the records corresponding to the updated page are requested from the database via a query, and at action 920 those records are provided to the element that initiated the query. In this manner, embodiments of the process 900 may facilitate an infinitely scrolling interface by providing paginated results for a base query, while avoiding having to execute the entire base query with an attendant performance impact.

It will be understood that each element of the flowcharts, and combinations of elements in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method, executed by a computer processor of an apparatus, for implementing an infinitely scrolling accumulator, the method comprising:
   providing, by the computer processor, a user interface comprising an available window and a selected window, the available window associated with an available window query and the selected window associated with a selected window query, wherein a first data structure is assigned to the available window query, the first data structure comprising one or more first filters configured to facilitate infinite scrolling in the available window, wherein a second data structure is assigned to the selected window query, the second data structure comprising one or more second filters configured to facilitate infinite scrolling in the selected window;
   displaying at least one record in the available window via the user interface;
   receiving, via the user interface, a selection of the at least one record displayed in the available window;
   receiving an input indicating an intent to move the selected at least one record from the available window to the selected window;
   based upon receiving the selection of the at least one record, modifying the first data structure by changing the one or more first filters and modifying the second data structure by changing the one or more second filters;
   in response to receiving the input, modifying the available window query based on the one or more first filters in the first data structure such that the available window query does not select the at least one record from a database;
   in response to receiving the input, modifying the selected window query based on the one or more second filters in the second data structure such that the selected window query selects the at least one record from the database; and
   optimizing at least one of the available window query or the selected window query based upon at least one of the one or more first filters or the one or more second filters, wherein optimizing at least one of the available window query or the selected window query reduces a length of the available window query or a length of the selected window query.

2. The method of claim 1, further comprising executing the available window query and the selected window query, wherein the results of the execution of the available window query and the selected window query are utilized to update the available window and the selected window, respectively.

3. The method of claim 1, further comprising:
   filtering the available window based on a filtering criterion;
   receiving, via the user interface, a selection of an interface control to include all records corresponding to the filtering criterion;
   determining a modification to the selected window query based on the filtering criterion; and
   modifying the selected window query to select records matching the filtering criterion.

4. The method of claim 1, further comprising modifying the available window query to exclude records matching the filtering criterion.

5. The method of claim 1, wherein the available window and the selected window are implemented using an infinite scroll design pattern.

6. The method of claim 1, further comprising:
   causing execution of the available window query to obtain a set of available window query results;
   determining a reduced subset of the available window query results, wherein the subset of available window query results contains fewer records than the set of available window query results; and
   loading the reduced subset of available window query results into the available window of the user interface.

7. The method of claim 6, wherein the reduced subset of available window query results is determined based at least in part on at least one of a position identifier associated with at least one record displayed within the available window or a page number associated with the at least one record displayed within the available window.

8. The method of claim 1, wherein the first data structure and the second data structure are in JavaScript Object Notation (JSON) format.

9. An apparatus for implementing an infinitely scrolling accumulator, the apparatus comprising a computer processor and a memory, the computer processor configured by instructions stored in the memory to configure the apparatus to at least:

provide, by the computer processor, a user interface comprising an available window and a selected window, the available window associated with an available window query and the selected window associated with a selected window query, wherein a first data structure is assigned to the available window query, the first data structure comprising one or more first filters configured to facilitate infinite scrolling in the available window, wherein a second data structure is assigned to the selected window query, the second data structure comprising one or more second filters configured to facilitate infinite scrolling in the selected window;

display at least one record in the available window via the user interface;

receive, via the user interface, a selection of the at least one record displayed in the available window;

receive an input indicating an intent to move the selected at least one record from the available window to the selected window;

based upon receiving the selection of the at least one record, modify the first data structure by changing the one or more first filters and modify the second data structure by changing the one or more second filters;

in response to receiving the input, modify the available window query based on the one or more first filters in the first data structure such that the available window query does not select the at least one record from a database;

in response to receiving the input, modify the selected window query based on the one or more second filters in the second data structure such that the selected window query selects the at least one record from the database; and optimizing at least one of the available window query or the selected window query based upon at least one of the one or more first filters or the one or more second filters, wherein optimizing at least one of the available window query or the selected window query reduces a length of the available window query or a length of the selected window query.

10. The apparatus of claim 9, further configured to execute the available window query and the selected window query, wherein the results of the execution of the available window query and the selected window query are utilized to update the available window and the selected window, respectively.

11. The apparatus of claim 9, further configured to:
filter the available window based on a filtering criterion;
receive, via the user interface, a selection of an interface control to include all records corresponding to the filtering criterion;
determine a modification to the selected window query based on the filtering criterion; and
modify the selected window query to select records matching the filtering criterion.

12. The apparatus of claim 11, further configured to modify the available window query to exclude records matching the filtering criterion.

13. The apparatus of claim 9, wherein the available window and the selected window are implemented using an infinite scroll design pattern.

14. The apparatus of claim 9, further configured to:
cause execution of the available window query to obtain a set of available window query results;

determine a reduced subset of the available window query results, wherein the subset of available window query results contains fewer records than the set of available window query results; and
load the reduced subset of available window query results into the available window of the user interface.

15. The apparatus of claim 14, wherein the reduced subset of available window query results is determined based at least in part on at least one of a position identifier associated with at least one record displayed within the available window or a page number associated with the at least one record displayed within the available window.

16. A non-transitory computer readable storage medium comprising instructions that, when executed by a computer processor of an apparatus, cause the computer processor to implement an infinitely scrolling accumulator, the instructions, when executed by the computer processor, are configured to cause the computer processor to at least:

provide, by the computer processor, a user interface comprising an available window and a selected window, the available window associated with an available window query and the selected window associated with a selected window query, wherein a first data structure is assigned to the available window query, the first data structure comprising one or more first filters configured to facilitate infinite scrolling in the available window, wherein a second data structure is assigned to the selected window query, the second data structure comprising one or more second filters configured to facilitate infinite scrolling in the selected window;

display at least one record in the available window via the user interface;

receive, via the user interface, a selection of the at least one record displayed in the available window;

receive an input indicating an intent to move the selected at least one record from the available window to the selected window;

based upon receiving the selection of the at least one record, modify the first data structure by changing the one or more first filters and modify the second data structure by changing the one or more second filters;

in response to receiving the input, modify the available window query based on the one or more first filters in the first data structure such that the available window query does not select the at least one record from a database;

in response to receiving the input, modify the selected window query based on the one or more second filters in the second data structure such that the selected window query selects the at least one record from the database; and optimizing at least one of the available window query or the selected window query based upon at least one of the one or more first filters or the one or more second filters, wherein optimizing at least one of the available window query or the selected window query reduces a length of the available window query or a length of the selected window query.

17. The computer readable storage medium of claim 16, further comprising instructions configured to execute the available window query and the selected window query, wherein the results of the execution of the available window query and the selected window query are utilized to update the available window and the selected window, respectively.

18. The computer readable storage medium of claim 16, further comprising instructions configured to:
- filter the available window based on a filtering criterion;
- receive, via the user interface, a selection of an interface control to include all records corresponding to the filtering criterion;
- determine a modification to the selected window query based on the filtering criterion; and
- modify the selected window query to select records matching the filtering criterion.

19. The computer readable storage medium of claim 18, further comprising instructions configured to modify the available window query to exclude records matching the filtering criterion.

20. The computer readable storage medium of claim 16, wherein the available window and the selected window are implemented using an infinite scroll design pattern.

* * * * *